United States Patent [19]

Ooga et al.

[11] Patent Number: 4,667,795
[45] Date of Patent: May 26, 1987

[54] CLUTCH COVER ASSEMBLY

[75] Inventors: Syougo Ooga, Osaka; Shouhei Minbu, Settu, both of Japan

[73] Assignee: Kabushiki Kaisha Daikin Seisakusho, Osaka, Japan

[21] Appl. No.: 738,784

[22] Filed: May 29, 1985

[30] Foreign Application Priority Data

May 30, 1984 [JP] Japan ................................ 59-110412

[51] Int. Cl.⁴ ............................................ F16D 13/46
[52] U.S. Cl. ................................. 192/70.27; 192/89.B
[58] Field of Search ................ 192/70.27, 70.28, 89 B, 192/109 R

[56] References Cited

U.S. PATENT DOCUMENTS 3,785,466  1/1974  Murai et al. .................. 192/70.27 X
4,562,910  1/1986  Maycock ....................... 192/89 B X

FOREIGN PATENT DOCUMENTS 1260890  2/1968  Fed. Rep. of Germany .... 192/89 B
3345727  6/1985  Fed. Rep. of Germany .... 192/89 B
  31003 12/1969  Japan ................................. 192/89 B
1213918 11/1970  United Kingdom ............... 192/89 B Primary Examiner—Rodney H. Bonck
Assistant Examiner—Alan G. Towner
Attorney, Agent, or Firm—Burns, Doane, Swecker & Mathis

[57] ABSTRACT

A clutch cover assembly comprising a pressure plate; a diaphragm spring; a clutch cover; a release mechanism and a pair of wire rings forming fulcrums for the diaphragm spring; and characterized in that; said clutch cover is provided at the inner periphery with circumferentially spaced projections, which are bent and extended through openings in the diaphragm spring toward the pressure plate, said wire rings are supported from the inner peripheral sides and the sides opposite to the diaphragm spring by said projections, the wire ring is provided with a cut and an end portion which is bent and inserted without a play into a circumferential space between a side edge of the opening in the diaphragm spring and a side edge of the projection, so that said bent end portion may prevent rotation of the diaphragm spring relative to the clutch cover.

3 Claims, 3 Drawing Figures 4,667,795

CLUTCH COVER ASSEMBLY

BACKGROUND AND SUMMARY OF THE INVENTION

The present invention relates to a clutch cover assembly used in a friction clutch of a diaphragm spring type for automobiles and others.

Generally, in such a clutch, a pair of wire rings are disposed at both sides of a diaphragm spring for forcing a pressure plate so that the wire rings may form fulcrums of the diaphragm spring. The wire rings are supported by tabs or projections provided at an inner periphery of a clutch cover. However, the projections are extended through openings, which are circumferentially enlarged portions of radial slits, in the diaphragm spring toward the pressure plate, and thus, there are circumferential spaces between the side edges of the projections and the side edges of the openings. Therefore, in the conventional structure, it is impossible to prevent the rotation of the diaphragm spring relative to the clutch cover, resulting in following disadvantages. Namely, the clutch cover rotates together with a flywheel of an engine, and the diaphragm spring, generally, rotates together with the clutch cover. However, when seizure occurs between the inner peripheral portions and a release bearing which is employed for operating the spring, the release bearing prevents or restricts the rotation of the diaphragm spring, so that the diaphragm spring rotates through a length corresponding to said space with respect to the clutch cover, and thus, the side edges of the projections collide with the side edges of the openings in the diaphragm spring. Therefore, dislocation or distorsion occurs at the wire rings and the diaphragm spring, and thus, the diaphragm spring can not operates smoothly, resulting in deviation of an operating characteristic of the clutch.

Accordingly, it is an object of the invention to provide an improved structure, overcoming the above-noted disadvantages, in which a wire ring prevents a relative rotation of a diaphragm spring and a clutch cover.

According to the present invention, a clutch cover assembly comprises a pressure plate; a diaphragm spring; a clutch cover; a release mechanism and a pair of wire rings forming fulcrums for the diaphragm spring; and is characterized in that; said clutch cover is provided at the inner periphery with circumferentially spaced projections, which are bent and extended through openings in the diaphragm spring toward the pressure plate, said wire rings are supported from the inner peripheral sides and the sides opposite to the diaphragm spring by said projections, the wire ring is provided with a cut and an end portion which is bent and inserted without a play into a circumferential space between a side edge of the opening in the diaphragm spring and a side edge of the projection, so that said bent end portion may prevent rotation of the diaphragm spring relative to the clutch cover.

Other and further objects, features and advantages of the invention will appear more fully from the following description of the preferrred embodiments of the invention.

DETAILED DESCRIPTION OF THE PREFERRED EMBODIMENTS

Figure 1:
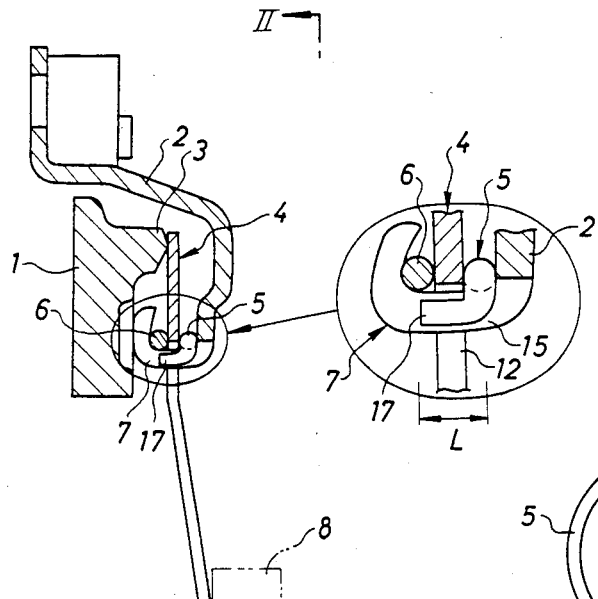
FIG. 1 is a schematic fragmentary sectional view of an embodiment of the invention.

Referring to FIG. 1, an annular pressure plate 1 is covered from its outer peripheral side and rear side by a clutch cover 2, of which radially outer portion is fixed to a flywheel (not shown) of an engine. The pressure plate 1 is provided at the rear surface with protrusions 3, which outer peripheral portions of an annular diaphragm spring 4 contact. A pair of wire rings 5 and 6 contact respective surfaces of a radially middle portion of the spring 4. The wire rings 5 and 6 form fulcrums for the spring 4, and are supported from radially inner sides and sides opposite to the spring 4 by projections 7 of the clutch cover 2. A release bearing 8 is faced to the side opposite to the pressure plate 1 of the inner peripheral portion of the spring 4. The release bearing is disposed around an output shaft 9, of which only a center line is illustrated, slidably only in an axial direction and is connected to a clutch pedal (not shown) through an appropriate link mechanism.

Figure 2:
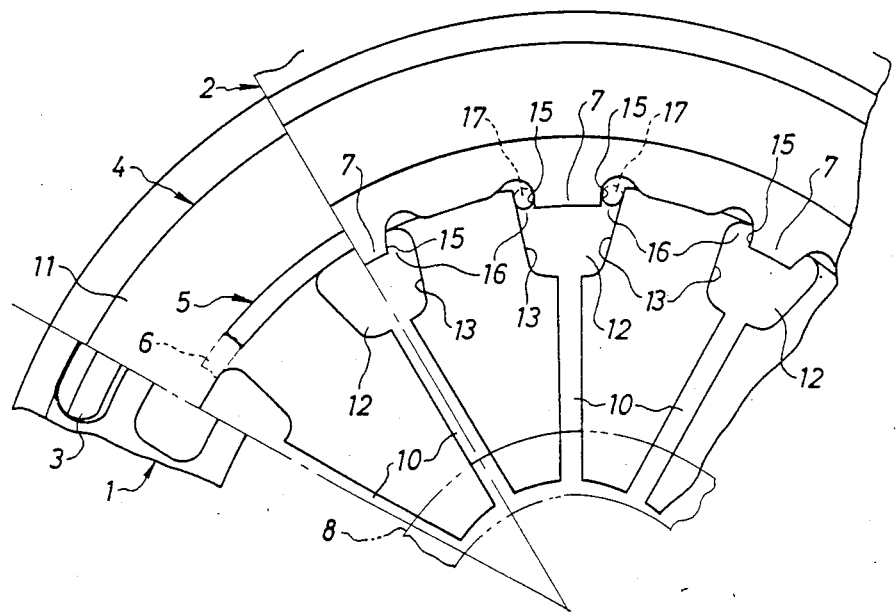
FIG. 2 is a schematic fragmentary view taken along line II—II in FIG. 1 with certain parts cut away.

Referring to FIG. 2, the diaphragm spring 4 is provided with radial slits 10 extending from the inner periphery to radially middle portions thereof. Only a radially outer portion 11 of the spring 4 is annularly continuous. Said wire rings 5 and 6 contact the radially inner portion of the annular portion 11. A radially outer portion of each slit 10 is circumferentially enlarged to form a nearly square opening 12 having round corners. Said projections 7 are integrally formed at the inner periphery of the annular body of the clutch cover 2, and are bent and extended toward the pressure plate 1 through the openings 12, respectively. In a manufacturing process, the projections 7 are bent by a bending machine (not shown) such as a press, and the openings 12 are circumferentially enlarged so that a die or other tool of the bending machine may be inserted into the openings 12. Numerals 13 indicate side edges of the openings 12 which extend substantially in the radial direction of the diaphragm spring 12. Circumferential spaces 16 are formed between side edges 15 of the projections 7 and the side edges 13 of the openings 12. Both end portions 17 of the wire ring 5 is bent and inserted into the spaces 16 to contact the side edges 13 and 15.

Figure 3:
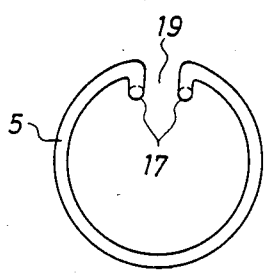
FIG. 3 is a schematic elevational view of a wire ring.

As shown in FIG. 3, the annular wire ring 5 is provided with one cut 19. Both end portions 17 are bent radially inwardly, as shown in FIG. 1, and further, are bent nearly perpendicular to the diaphragm spring 4 to be inserted into the openings 12.

Said plurality of projections 7 and openings 12 have same sizes and shapes, respectively, and thus, the spaces 16 having the same circumferential length are formed between respective side edges 13 and 15. According to these structures, in an assembling process, the end portions 17 can be inserted into any of the spaces 16 and the assembling operation can be facile in comparison with a structure in which only one pair of spaces are provided for the end portions 17.

An operation can be as follows.

Referring to FIG. 1, in an engaged condition of the clutch, the diaphragm spring 4 elastically forces the pressure plate 1, so that the pressure plate 1 presses a friction facing (not shown) of a clutch disc against the flywheel. When the clutch is to be disengaged, the clutch pedal is stepped on, and the release bearing 8 pushes the inner peripheral portion of the diaphragm spring 4 toward the pressure plate 1. Whereby, the spring 4 releases the pressing force against the pressure plate 1, and the pressure plate 1 releases the pressing force against the friction facing. In both of said engaged and released conditions, the clutch cover 2 rotates together with the flywheel and the diaphragm spring 4 and the wire rings 5 and 6 continuously rotates together with them.

In said driving condition, when a seizure occurs between the release bearing 8 and the inner peripheral portion of the diaphragm spring 4, the release bearing 8 applies a force or resistance against the rotation to the spring 4. Even in this case, since the end portions 17 are inserted into the spaces 16 between the projection 7 and the side edges 13 of the opening 12 in the spring 4 without a play, the diaphragm spring 4 does not rotate relatively to the clutch cover 2, and thus, the spring 4, the wire rings 5 and 6 and the projections 7 do not relatively rotate in the circumferential direction and do not collide with each other. As stated above, since the relative rotation and collision are prevented, dislocation and distorsion of the diaphragm spring 4 and the wire rings 5 and 6 are prevented. Further, the spring 4 and the projections 7 can also be prevented from biting into each other.

When the resistance force is applied to the spring 4 from the release bearing 8 as stated above, the end portions 17 are pressed to the side edges 13 and 15. However, the wire ring 5 and the diaphragm spring 4 are made from hard material, and further, the end portion 17 is pressed at its cylindrical outer peripheral surfaces to the side edge 13 of the diaphragm spring 4. Therefore, abnormal wear and biting do not occur at the pressed portions of the side edge 13 and the end portion 17. Although, the projection 7 is made from material which is softer than that of the wire ring 5, the end portion 17 is also pressed at its cylindrical outer peripheral surface to the projection 7, and further, it is pressed through a long section L, corresponding to a length of the bent portion of the end portion 17 illustrated in an enlarged part in FIG. 1. Therefore, the abnormal wear and biting do not occur also at the pressed portions of the projection 7 and the end portions 17. If a slight space is produced around the end portions 17 by an error in size or others, the end portions 17 may slightly collide with the spring 4 and the projection 7. However, even in such a case, the abnormal wear and biting can be prevented by said reason.

According to the invention, as stated hereinbefore, the bent end portions 17 of the wire ring 5 are interposed between the side edges 13 of the opening 12 in the diaphragm spring 4 and the side edges 15 of the projection 7, so that the diaphragm spring 4 may be prevented from rotating relatively to the clutch cover 2. Therefore, positioning of the spring 4 and the wire rings 5 and 6 can be performed accurately, and the spring 4 can be prevented from biting into the projections 7. Thus, the spring 4 can always be operated smoothly, resulting in an improved releasing and engaging operation of the clutch.

The present invention may be modified into such a structure that the wire ring 6 at the pressure plate side 1 is provided with bent end portions, which are inserted into the spaces 16. In this case, the end portions 17 of the wire ring 5 may be eliminated. The bent end portions for preventing the relative rotation may be formed at one end of the wire ring 5 and one end of the wire ring 6.

What is claimed is:

1. A clutch cover assembly comprising:
   a pressure plate for pressing a friction facing to a flywheel;
   a diaphragm spring having an outer peripheral portion seated on the rear surface of the pressure plate for forcing the pressure plate toward the flywheel, having circumferentially spaced openings;
   a clutch cover fixed to the flywheel and covering the outer peripheries and rear sides of the pressure plate and the diaphragm spring, having an inner periphery with circumferentially spaced projections which are bent and which extend through the openings in the diaphragm spring toward the pressure plate;
   a release mechanism adapted to connect to an inner peripheral portion of the diaphragm spring for deforming the diaphragm spring so as to release the pressing force against the pressure plate; and
   a pair of wire rings contacting both surfaces of a radially middle portion of the diaphragm spring to form fulcrums for the diaphragm spring;
   said wire rings being supported by the projections from the inner peripheral sides and the sides opposite to the diaphragm spring, one wire ring being provided with a cut and an end portion which is bent and inserted substantially without a play into a circumferential space between a side edge of one of said openings in the diaphragm spring and a side edge of one of said projections, so that said bent end portion may prevent rotation of the diaphragm spring relative to the clutch cover.

2. A clutch cover assembly of claim 1 wherein said diaphragm spring is provided with radial slits extending radially outwardly from the inner periphery, the radially outer end of each slit is circumferentially enlarged to form said opening, said opening being sufficiently large to receive portions of a bending machine for bending said projections, all of said openings having the same circumferential length, and all of said projections having the same circumferential length.

3. A clutch cover assembly of claim 1 wherein said wire ring having a bent end portion is provided with a cylindrical outer peripheral surface, said end portion being contacted at the cylindrical outer peripheral surface with the side edge of the projection and the side edge of the opening, and the bent end portion of the wire ring contacting the side edge of the projection extends axially along the side edge of the projection.

* * * * *